Oct. 23, 1923.　　　　　　　　　　　　　　　　1,471,778
F. T. COPE
COMBINED LIGHT AND HORN SWITCH
Filed Oct. 5, 1920

INVENTOR
Frank T. Cope,
ATTYS.

Patented Oct. 23, 1923.

1,471,778

UNITED STATES PATENT OFFICE.

FRANK T. COPE, OF ALLIANCE, OHIO.

COMBINED LIGHT AND HORN SWITCH.

Application filed October 5, 1920. Serial No. 414,794.

*To all whom it may concern:*

Be it known that I, FRANK T. COPE, a citizen of the United States, residing at Alliance, in the county of Stark and State of Ohio, have invented a new and useful Combined Light and Horn Switch, of which the following is a specification.

This invention relates to a combination light and horn switch for automobiles adapted to be operated from the usual horn button mounted upon the steering wheel.

The objects of the invention are the provision of a horn switch and light switch controlling the head lights, also the spot light or any other combination of lights desired, on an automobile, both of said switches being arranged to be operated by the usual rod which extends through the steering column and is provided upon its upper end with a button for operating, means being provided for reciprocating said rod to operate the horn switch and for rotating the rod to operate the light switch.

The above objects together with other objects readily apparent, are attained by providing within the steering column a rod arranged to be reciprocated and rotated, a button for operating being provided upon the upper end of the rod, the lower end thereof being arranged to engage the horn switch and to close said switch when the rod is moved downwardly through the steering column, a rock arm being fixed upon the lower end of the rod and connected to a link which is operatively connected to the light switch.

The invention thus set forth in general terms is illustrated in the accompanying drawings forming part hereof in which—

Figure 3:
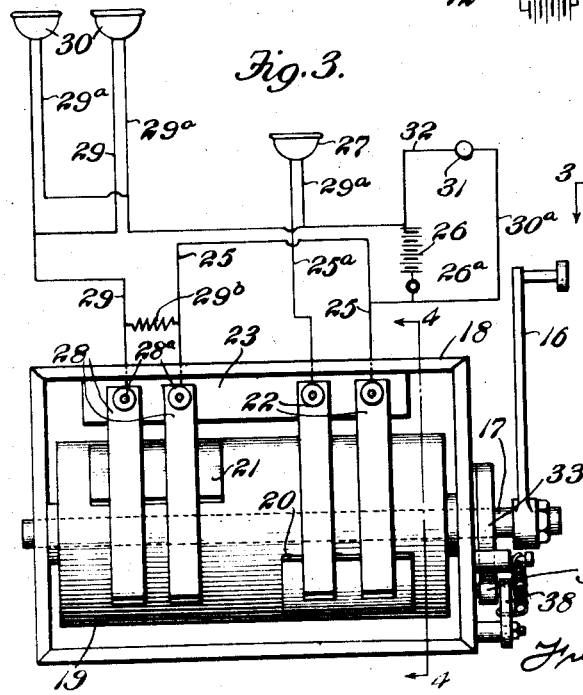
Figure 4:
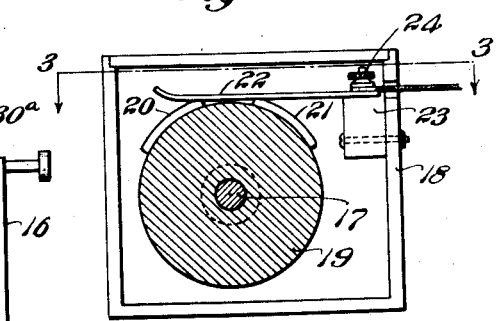

Fig. 3 a section through the light switch on the line 3—3 Fig. 4, and

Fig. 4 a section on the line 4—4 Fig. 3.

A practical embodiment of the invention is disclosed in the accompanying drawings forming a part of this specification in which similar numerals of reference indicate corresponding parts throughout the several views.

Figure 2:
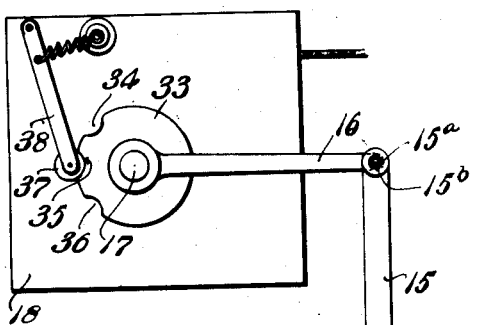
Fig. 2 is an end elevation of the light switch.
Figure 1:
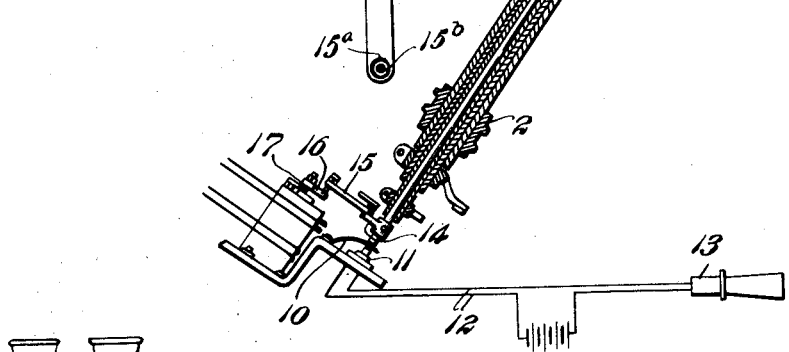
Figure 1 is a side elevation of an embodiment of the invention showing the application thereof to a steering column, parts being shown in section for the purpose of illustration.

Referring first to the construction illustrated in Fig. 1, the numeral 1 indicates the usual hollow steering column upon the lower end of which is mounted a worm 2, the steering wheel 3 being fixed to the upper end of said column. A hollow column 4 is located within the steering column and arranged to be rotated therein by means of the lever 5, the lower portion of said column being operatively connected to the throttle of the engine. A similar column 6 is rotatably mounted within the column 4 and arranged to be rotated therein by means of the lever 7, the lower end of said column being operatively connected to the spark controlling means.

Slidably and rotatably mounted within the hollow column 6 is a rod 8, a button 9 being provided upon the upper extremity thereof for the purpose of reciprocating and rotating the rod. The lower end of the rod engages a spring 10 which normally holds the rod in the position shown in Fig. 1, out of engagement with the horn switch, which is preferably in the form of a push button 11, wires 12 connecting the battery and the horn 13 with said push button.

A downward pressure upon the button 9 will move the lower end of the rod 8 into engagement with the push button 11, closing the circuit from the battery to the horn. This construction itself is in common use and no claim is made to the operation of the horn in this manner, the invention residing in the operation of the light switch by the same rod which operates the horn switch.

An arm 14 is fixed upon the lower end of the rod 8 and connected by means of a link 15 with the arm 16 which is fixed upon the shaft 17, said shaft being journaled through suitable bearings in the box 18 and having fixed thereon a cylinder 19 formed of fibre or other suitable insulating material, contact plates 20 and 21 being mounted upon said cylinder.

The link 15 is provided at each end with an enlarged aperture 15ª through which the pins 15ᵇ, carried by the arms 14 and 16, are located. This provides a loose connection between the arms and the link, allowing for the reciprocation of the rod 8.

A pair of spring fingers 22 are mounted upon a suitable bracket 23 within the box 18, a binding post 24 being provided upon each of said spring fingers, a wire 25 connecting one of said binding posts with the battery 26 and a wire 25ª connecting the other binding post with the spot light 27. A similar pair of spring fingers 28 is arranged to contact with the plate 21, binding posts 28ª being connected to the extremities of said fingers, a wire 29 connecting one of said binding posts with the head lights 30, a wire 29ª connecting said head lights and the spot light with the battery 26.

The other binding post 28 is connected to the wire 25 which leads to the battery. A resistance element 29ᵇ connects the wires 29 and 25 in order to allow a small part of the current to flow through the head lights when the switch is open, thus causing the lamps to burn dimly.

When the cylinder is so turned as to move the contact plate 21 entirely out of engagement with the fingers 28 and to keep the plate 20 in contact with the fingers 22, the head lights will be dimmed, as the only current passing therethrough must pass through the resistance element 29ᵇ, while the circuit to the spot light will be closed, causing the spot light to burn. When the cylinder is moved in the other direction, moving the contact plate 20 out of engagement with the fingers 22 to allow the plate 21 to still remain in engagement with the fingers 28, the spot light will be off and the head lights will burn brightly.

A manually operated switch 26ª is interposed between the battery 26 and the wires 25 and 30ª, the wire 30ª leading to the tail light 31, which is also connected to the battery by the wire 32. The switch 26ª is preferably in the form of a push button as shown and is provided for the purpose of cutting off all of the lights when the automobile is not in use.

In order to hold the cylinder in any of the desired positions above described, a disc 33 is fixed upon the outer extremity of the shaft 17, said disc being provided with the notches 34, 35 and 36 arranged to be engaged by the roller 37 carried upon the spring pressed lever 38. When the cylinder is moved into position to cause the head lights and the spot light both to be lit, the roller 37 will be seated in the notch 35. When the notch 34 is moved into engagement with the roller 37 the head lights will be lit and the spot light extinguished and when the notch 36 is engaged by the roller, the head lights will be dimmed and the spot light lit.

It will thus be evident that a downward movement of the rod 8 will operate the horn, while a rotation of the rod as above described will control the operation of the head lights and spot light. It will, of course, be understood that the wiring diagram shown in Fig. 3 is merely an illustration of one application of the invention and that any desired combination for controlling the lights may be provided without departing from the invention.

I claim:—

1. In combination with a hollow steering column a rod slidably and rotatably mounted therein, a push button arranged to be engaged by the lower end of the rod when the rod is depressed, a rotatable switch member spaced from one side of the rod and held against axial movement, arms fixed upon the rod and rotatable switch member, and a link loosely connecting said arms whereby the rod may be depressed without moving the switch member, the switch member being rotated by the rotation of the rod.

2. In combination with a hollow steering column a rod slidably and rotatably mounted therein, a push button arranged to be depressed by the lower end of the rod when the rod is depressed, a switch member spaced from one side of the rod and held against axial movement, an operative connection between the rod and the switch member whereby the rod may be depressed without moving the switch member, the switch member being actuated by the rotation of the rod.

In testimony that I claim the above, I have hereunto subscribed my name.

FRANK T. COPE.